US007052016B2

(12) United States Patent
Tejima

(10) Patent No.: US 7,052,016 B2
(45) Date of Patent: May 30, 2006

(54) SLIDING ELEMENT

(75) Inventor: Yoshihiro Tejima, Saitama (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/669,352

(22) Filed: Sep. 25, 2003

(65) Prior Publication Data
US 2004/0080112 A1 Apr. 29, 2004

(30) Foreign Application Priority Data
Oct. 23, 2002 (JP) .............................. 2002-308197
Aug. 11, 2003 (JP) .............................. 2003-291558

(51) Int. Cl.
*F16J 15/34* (2006.01)
(52) U.S. Cl. ....................... 277/399; 277/400
(58) Field of Classification Search ................ 277/399, 277/400
See application file for complete search history.

(56) References Cited

U.S. PATENT DOCUMENTS

| | | | | |
|---|---|---|---|---|
| 3,109,658 A | * | 11/1963 | Barrett et al. ................ | 277/400 |
| 3,586,340 A | * | 6/1971 | Otto et al. .................... | 277/400 |
| 3,744,805 A | * | 7/1973 | Heinrich ....................... | 277/400 |
| 3,804,424 A | * | 4/1974 | Gardner ........................ | 277/360 |
| 5,090,712 A | * | 2/1992 | Pecht et al. .................. | 277/400 |
| 5,435,574 A | * | 7/1995 | Victor et al. ................. | 277/379 |
| 5,447,316 A | * | 9/1995 | Matsui ......................... | 277/400 |
| 5,492,341 A | * | 2/1996 | Pecht et al. .................. | 277/400 |
| 5,769,604 A | * | 6/1998 | Gardner et al. ........... | 415/170.1 |
| 6,152,452 A | * | 11/2000 | Wang .......................... | 277/400 |
| 2003/0178781 A1 | * | 9/2003 | Tejima ........................ | 277/399 |

FOREIGN PATENT DOCUMENTS

| | | | |
|---|---|---|---|
| DE | 38 19 566 A1 | * | 12/1989 |
| JP | 57-161368 | * | 10/1982 |
| JP | 59-231269 | * | 12/1984 |

* cited by examiner

Primary Examiner—Alison K. Pickard
(74) Attorney, Agent, or Firm—Arent Fox PLLC

(57) ABSTRACT

The present invention relates generally to a technical domain of a sliding element engaging a relative rotational motion. A primary objective of a sliding element of the present invention is to decrease a friction coefficient of the sliding face and to improve the seal performance. The element disposes dimples on at least one sliding face of a pair of relatively rotating sliding faces wherein the dimples are inclined towards a rotary direction when viewed along a radial direction. The sliding face of the sliding element also disposes a plurality of ring-formed dimple sections which form annuli of distinct diameters wherein the dimples are arranged along the individual annuli. The sliding face also disposes annular dam sections which are located between the individual dimple sections.

8 Claims, 14 Drawing Sheets

SLIDING ELEMENT

BACKGROUND OF THE INVENTION

1. Field of the Invention

The present invention relates generally to a technical domain of a sliding element engaging a relative rotational motion. More particularly, the invention relates to a sliding element which reduces a friction coefficient on the sliding face and prevents a fluid from leaking from the sliding faces

2. Description of the Related Art

Related art of the present invention is found in U.S. Pat. No. 4,407,513 issued to Takenaka; U.S. Pat. No. 4,415,168 issued to Takenaka; U.S. Pat. No. 4,423,879 issued to Takenaka; U.S. Pat. No. 5,312,117 issued to Takenaka. These patents disclose a seal ring of a mechanical seal shown in FIG. 13. FIG. 13 is the prior art 1 related to the present invention.

FIG. 13 is an oblique view of the seal ring 110 which is one of a pair of seal rings used for a mechanical seal. This seal ring 110 is disposed in a mechanical seal for a compressor with a highly pressurized fluid which is typically used under a situation of varying temperature. In the mechanical seal, the seal ring 110 out of the pair of seal rings serves as either a rotary seal ring or a stationary seal ring. Also in this mechanical seal, a relative sliding motion between a sliding face of a rotary seal ring and a sliding face of a stationary seal ring provides a fluid-tight seal against the fluid which is located on either side between a rotary shaft and a housing.

There are eleven thin line grooves disposed on the sliding face 110A in an equally spaced manner along a circumference of the face which extend form the inner circumference towards the outer circumference and are inclined to an opposite direction relative to a rotary direction. The thin line grooves 115 do not reach the outer circumferential edge of the sliding face 110A, but have an open end towards the inner circumferential edge. It is described that the thus arranged thin line grooves 115 improves a seal performance against the fluid. However, for the small number of thin line grooves 115 disposed on the sliding face 110A, which is shown in FIG. 13, a fluid does not stay on the sliding face 110A of the seal ring 110 when the seal ring 110 is subjected to a low rotational speed. As the result, an increased sliding friction will cause abrasion, which in turn will lead to a leakage of the fluid.

There is the seal ring 155 shown in FIG. 14 as another prior art relative to the present invention, which is designated as the prior art 2.

This seal ring 155 is disposed in a mechanical seal as a stationary seal ring or/and rotary seal ring. As far as a fluid leakage problem is concerned, this seal ring 155 performs better than the prior art 1.

In this prior art 2, there are concave sections 156 disposed at the crossing points of radial directions and circumferential directions.

The form of the concave section 156 is elliptic when viewed from the top and the width of the minor axis is in the range of from $30 \times 10^{-6}$ m to $100 \times 10^{-6}$ m and the width of the major axis is in the range of from $60 \times 10^{-6}$ m to $500 \times 10^{-6}$ m. The concave section 156 is so arranged that the maximum width is a little greater than twice of the minimum width.

The concave section 156 tends to reserve a fluid inside the section which flows in between the sliding face 155A of the seal ring 155 and a sliding face of a stationary seal ring. The fluid flowing in from the outer circumference side of the seal ring 155 is trapped and reserved in the concave section 156 before the fluid reaches the inner circumference edge. The fluid retained in the concave section 156 is pushed toward the opposite direction relative to a rotational direction of the concave 156 due to a viscosity of the fluid and a rotary motion of the concave section 156, and a portion of the fluid beyond a reserving capacity of the concave section 156 starts to slip out from an outer circumferential edge of the concave section 156, which moves between the relatively sliding faces and is eventually trapped by an adjacent concave section 156. Thus, the fluid is pushed backward relative to a rotary direction of the sliding face 155A.

The concave section 156 of the sliding face 155A has an elliptic form and the length and width of the section 156 are set small. The longitudinal axis of the concave section 156 is inclined to an opposite direction relative to a rotary direction. And the number of the concave section 156 deployed is relatively small. Therefore, the concave sections 156 are not good enough to be able to trap and reserve a fluid on the sliding face 155A. Also the longitudinal length of the concave section 156 is so small that it cannot creates a sufficient pumping effect for pushing back the fluid towards a fluid reservoir. Thus, no significant seal performance is exhibited with the prior art. There is also a room for improvement in terms of a reduction in friction coefficient and frictional heat generation. For a slow rotational speed of the seal ring 155, in particular, a reduced lubrication effect makes it difficult to decrease the sliding friction.

There is another seal ring for a mechanical seal which is not shown in a figure but is similar to the one shown in FIG. 14 as another prior art relative to the present invention, which is designated as a prior art 3. On a sliding face of the seal ring for a mechanical seal, there are concave sections whose longitudinal direction coincides with a radial direction of the seal ring, and the concave sections are located at the crossing points of radial directions and circumferential directions. In the arrangement, the concave sections are disposed like a houndstooth check spreading in both a radial direction and a circumferential direction. Major axis of every concave section is aligned with the radial direction of the sliding face.

Since the major axis of the concave section coincides with the radial direction of the sliding face, as a rotation of the seal ring increases the more fluid is captured within the concave section, and as the result a dynamic pressure within the concave section gradually increases. Therefore a lubrication layer of the fluid is created on the sliding face by the fluid escaping from the concave section due to its increased dynamic pressure. The fluid within the concave section, however, cannot be preserved for a long period of time, especially under a low rotational speed. As a result, the friction coefficient of the sliding face will gradually increase in a long run under a low rotational speed. Also the lubricant escapes the concave section along a radial direction of the sliding face, which makes it difficult to improve the seal performance. Furthermore, the concave section which serves as a dynamic pressure inducing groove constitutes a contact-type seal under a low rotational speed and does not exhibit an ability of generating a dynamic pressure.

Technical problems related to these prior arts remain in that they suffer from a difficulty of creating a lubrication layer by drawing in a fluid for reducing a friction coefficient, and also that they find a difficulty in retaining a fluid once drawn in on the sliding face as well as in pushing back the fluid for securing a seal performance of the fluid. Such a difficulty on creating a lubrication layer will cause a heat generation on the sliding face.

In particular, a difficulty in improving a seal performance as well as decreasing a friction coefficient arises when the sliding element rotates at a slow speed and a fluid pressure becomes low.

A primary object of the present invention is to decrease a frictional resistance on a sliding face of a sliding element by retaining a lubricant fluid on the sliding face while the element is in rotation. Another object is to provide a lubrication layer on the sliding face for improving a seal performance. Yet another object is not only to prevent a heat generation of the sliding face of the sliding element during rotation but also to prevent the sliding face from wearing. Yet another object is to improve a seal performance as well as to decrease a frictional resistance even when a sliding element rotates at a low speed.

SUMMARY OF THE INVENTION

A solution to these problems is embodied as follows. A preferred embodiment of a sliding element constructed in accordance with the principles of the present invention is a sliding element for providing a seal against a fluid between sliding faces of a pair of relatively slidable components, one of the components being a stationary sliding element and the other being a rotary sliding element, the fluid being located around either inner circumference or outer circumference of the sliding faces, at least one of the opposing sliding faces having elongate dimples whose longitudinal direction is inclined towards a rotary direction relative to a direction facing the fluid side, a plurality of the dimples being disposed on the sliding face along a radial direction of the face, the dimples also forming a plurality of annuli along a circumference of the sliding face, the annularly arranged dimples disposing a plurality of annular dam sections therebetween.

In the preferred embodiment of a sliding element constructed in accordance with the principles of the present invention, the sliding face disposes annularly arranged dam sections and also annularly arranged dimple sections each of which are located between the individual dam sections wherein dimples are arranged in the individual dimple sections along the circumference and are inclined towards a rotary direction relative to a direction facing the fluid side. Therefore, the dimple sections let the fluid flow into over the sliding face and the dam sections keep back the fluid such that the fluid is reserved in the dimple sections. Also the dimple sections exhibit a function of pushing back the fluid on the sliding face towards a fluid reservoir. Thus, frictional resistance of the sliding face is reduced and the seal performance is improved as well. In particular, under a circumstance of low fluid pressure or low rotational speed commonly encountered by general machine apparatus, a large number of dimples thus arranged not only are able to achieve a significant reduction in frictional resistance but also are able to improve a seal performance.

Furthermore, the sliding face which becomes liable to damage due to a large number of dimples is prevented from being damaged or being worn out owing to a reinforcement provided by the dam section. Durability of the sliding face is thus improved.

DETAILED DESCRIPTION OF THE INVENTION

Described below is details of the figures of preferred embodiments of a sliding element of the present invention according to actual design drawings with accurate dimensional relations.

Figure 1:
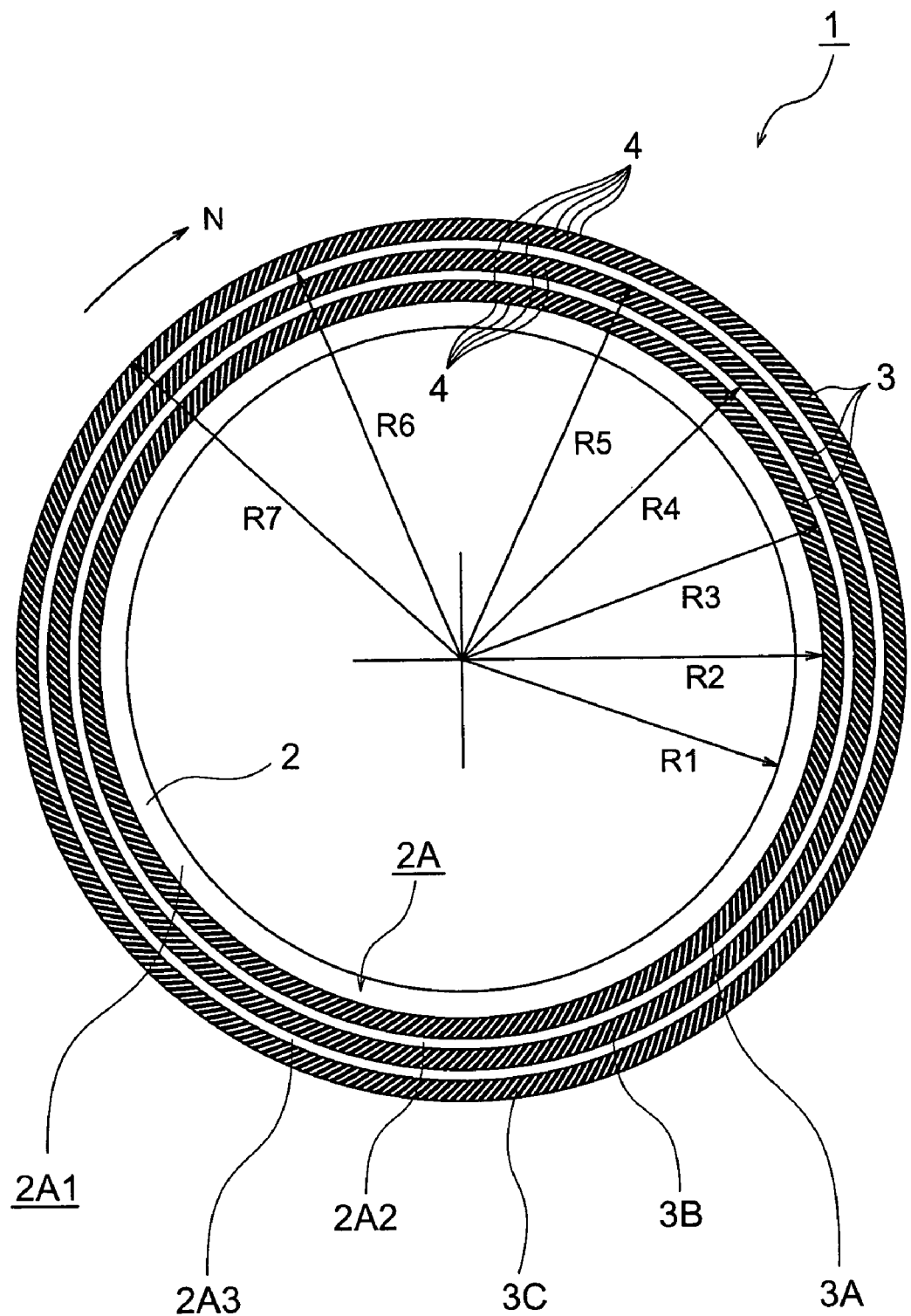
FIG. 1 is a front view of a sliding face of a sliding element representing a first preferred embodiment related to the present invention.
Figure 2:
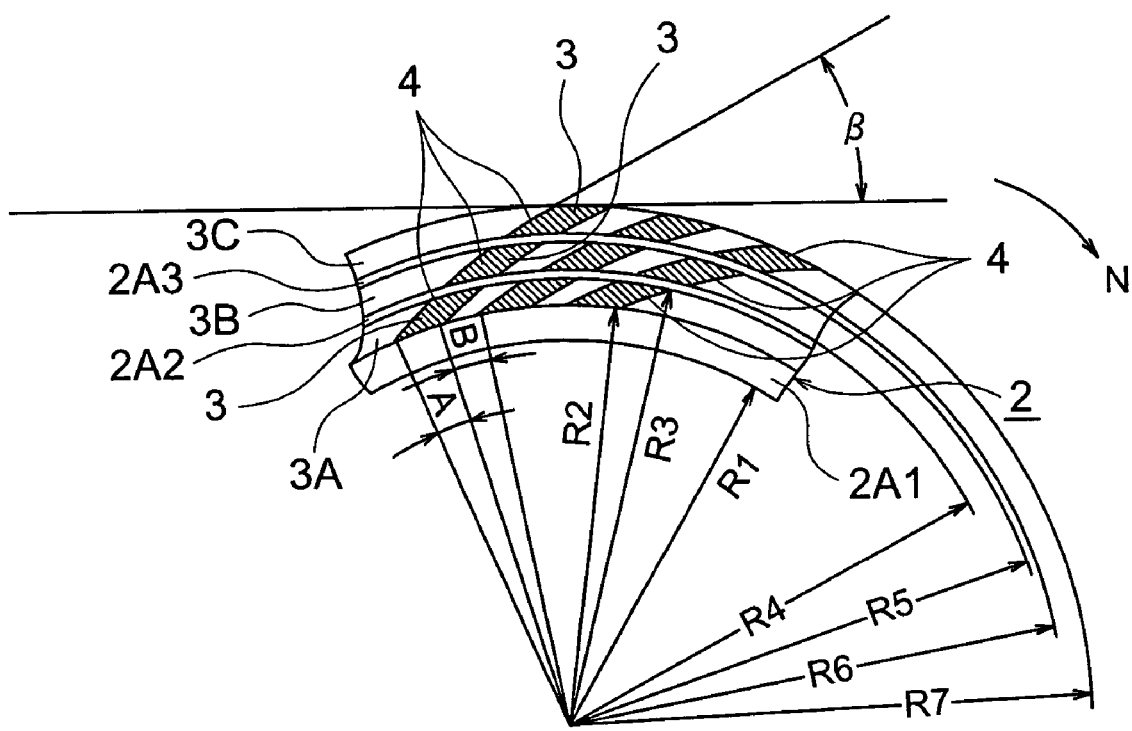
FIG. 2 is a front view of an enlarged fragment of the sliding face shown in FIG. 1.

FIG. 1 shows the sliding face 2 of the sliding element 1 as a first preferred embodiment of the present invention. FIG. 2 also shows an enlarged view of a portion of dimple sections 3A, 3B, 3C and dam sections in the sliding face 2 of the sliding element 1.

FIG. 1 illustrates the sliding element 1 wherein a fluid is located around the outer circumferential edge of the sliding face 2. For instance, as shown in the mechanical seal apparatus of FIG. 9, the sliding element 1 is disposed as a rotary seal ring. Mating sliding element with a dimpleless, plain sliding face is disposed as a stationary seal ring at an oppositely adjacent side relative to the element 1. Seal against the fluid being located on the outer diameter side (either side) of the rotary seal ring and stationary seal ring is thus attained.

This sliding element 1 can be utilized for a shaft bearing which either rotates with a rotary shaft while retaining a lubricant between the sliding faces or rotates with a rotary shaft while sealing against lubricant to one side which is axially located relative to the sliding face.

Figure 9:
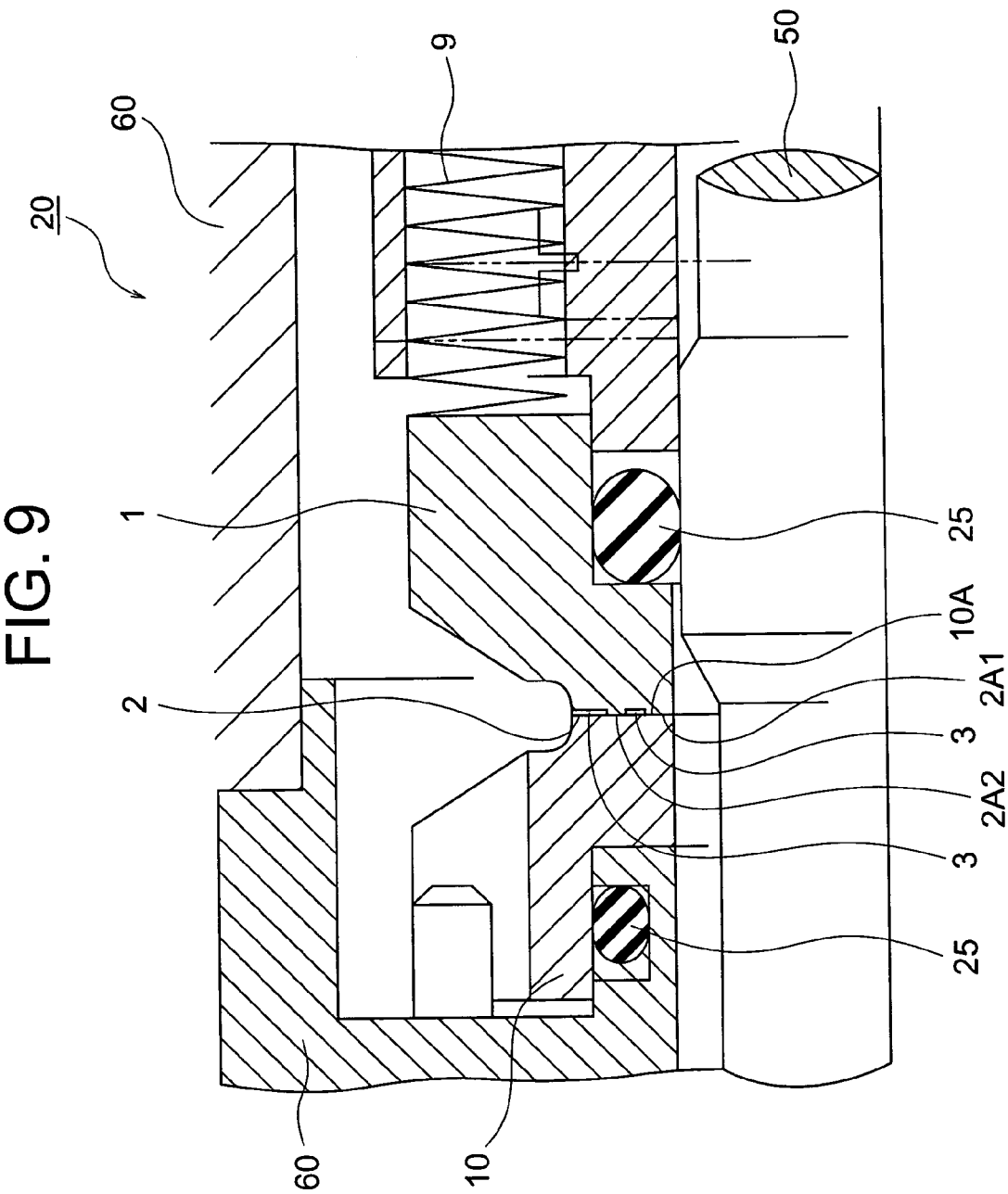
FIG. 9 is a half cross-sectional view of a mechanical seal to which a sliding element related to the present invention is attached.

There are the dimple sections 3A, 3B, 3C and the dam sections 2A1, 2A2, 2A3 on the sliding face 2 of the sliding element 1. The sliding element 1 has an annular form as seen in FIG. 9 which has the sliding face 2 on its end surface. The sliding element 1 is subjected to a clockwise rotation (a direction pointed by an arrow N) on the sliding face 2. The sliding face 2 of the sliding element 1 disposes a plurality of single tier grooves 4 which have a form of circular arc and are inclined relative to an outer circumference of the first dam section 2A1 wherein the grooves have open ends at the outer circumferential edge of the sliding face and a plurality of the grooves are arranged along the circumference. The single tier grooves 4 are crossed by the second dam section 2A2 and a third dam section 2A3 of different diameters, which partition the grooves 4 into the first dimple section 3A, the second dimple section 3B and the third dimple section 3C. That is, this sliding face 2 provides the first dimple section 3A, the second dimple section 3B and the third dimple section 3C which are divided by the first dam section 2A1, the second dam section 2A2 and the third dam section 2A3 and define concentric annuli with increasing radius in the order of the first dimple section 3A, the second dimple section 3B, and the third dimple section 3C. For individual dimples 3 in the dimple sections 3A, 3B, 3C, the longitudinal length L of the groove measured along the inclination is greater than the width W (refer to FIG. 5 for the pictorial definition of W and L).

It is known that a similar merit will be provided with a different arrangement of the first dimple section 3A, the second dimple section 3B, third dimple section 3C wherein a row of the inclined dimples 3 are not necessarily lined up along a single line as a single tier groove. It also has been verified that even if rows of dimples 5 for the individual dimple sections 3A, 3B, 3C are not lined up with each other, a large number of dimples 3 in the dimple sections 3A, 3B, 3C combined with the dam sections 2A1, 2A2, 2A3 partitioning the dimple sections 3A, 3B, 3C not only improves a seal performance but also can decrease a frictional resistance.

A plurality of radially growing concentric annuli consisting of the first dimple section 3A, the second dimple section 3B, the third dimple section 3C are separated by the second dam section 2A2 and third dam section 2A3 and retain dimples 3 each of which has a form of elongate groove whose longitudinal direction is inclined toward a rotary direction when viewed from the fluid side.

The width of the first dimple section 3A in a radial direction is given by R3–R2. Similarly the width of the second dimple section 3B in a radial direction is defined by R5–R4. Likewise, the width of the third dimple section 3C is given by R7–R6.

Groove form of the dimples 3 in the first dimple section 3A, the second dimple section 3B, and the third dimple section 3C can be so arranged that the width of the groove is a little widened near the outer circumferential side. This means that, as seen in FIG. 2, the spirally curved single tier groove 4 (a single row of the dimples 5 lining up along the inclination direction) has the groove width W (refer W in FIG. 5) which gradually increases as the groove approaches the outer circumference. The single tier groove 4 is intersected by the annular second dam section 2A2 and the third dam section 2A3 and partitioned into the first dimple section 3A, the second dimple section 3B and the third dimple section 3C. As an another example which is different from FIG. 2, the groove width W of the dimples 3 may be made uniform at both inner and outer circumferences of the sliding face 2.

A single row of the dimples 3 is inclined relative to the outer circumference toward a rotary direction wherein an inclination of the dimples measured from a tangential line of the outer diameter is approximately β=30 degrees. The distance B between two adjacent dimples 3 measured at the inner circumference is more or less equal to the circumferential width A of the dimples 3 (see FIG. 2). The angle β is in the range of from 5 to 80 degrees, preferably in the range of from 10 to 55 degrees.

The width T (refer T in FIG. 5) of the dimple sections 3A, 3B, 3C in a radial direction is made greater than the width of the second dam section 2A2 and the third dam section 2A3 which is given by R4–R3 and R6–R5, respectively. Also it is up to a designer's discretion that the width of the first dam section 2A1 in a radial direction be made greater than that of the second dam section 2A2 and the third dam section 2A3. The second dam section 2A2 and the third dam section 2A3 are able to prevent the dimples 3 from being damaged.

Figure 3:
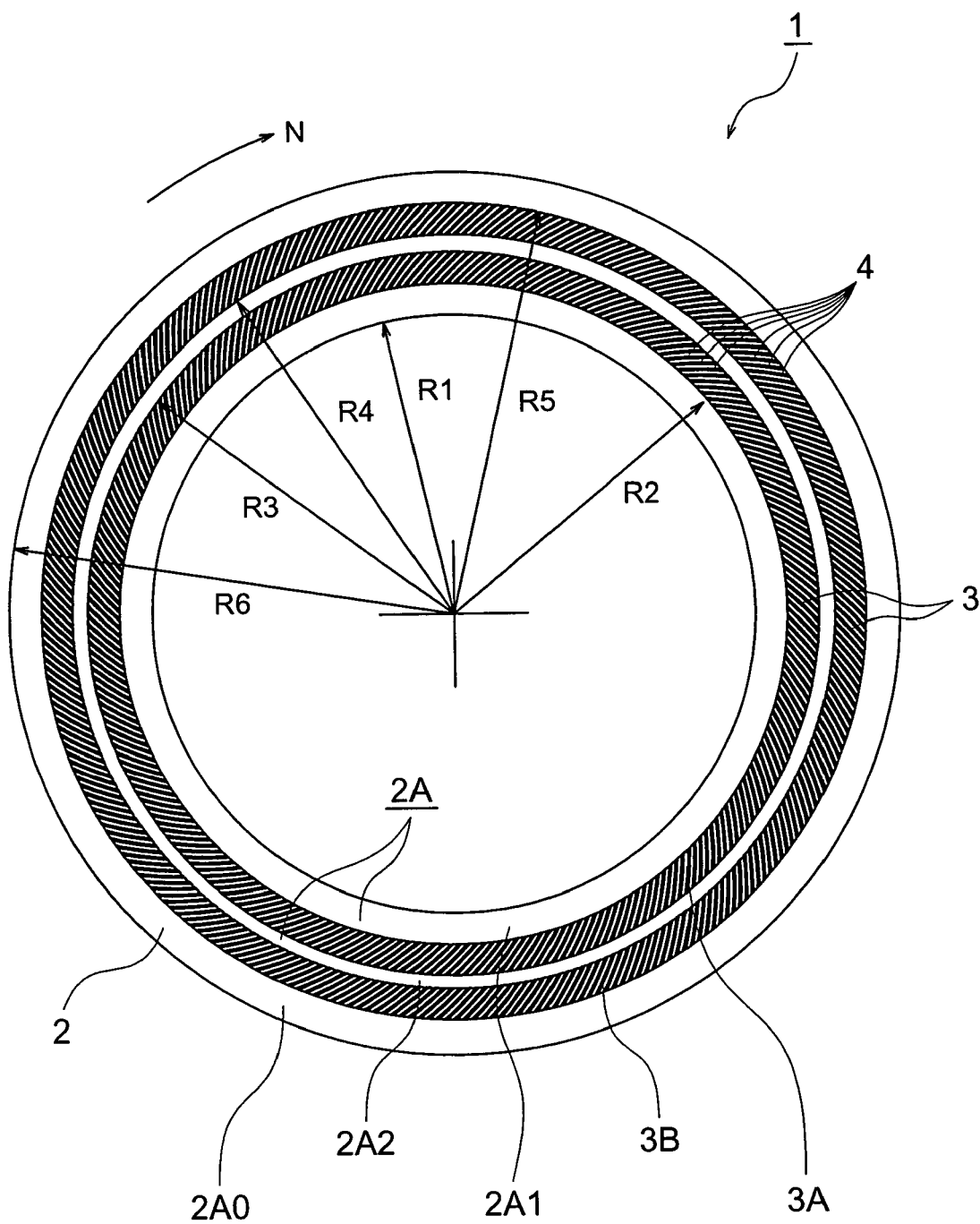
FIG. 3 is a front view of a sliding face of a sliding element representing a second preferred embodiment related to the present invention.
Figure 4:
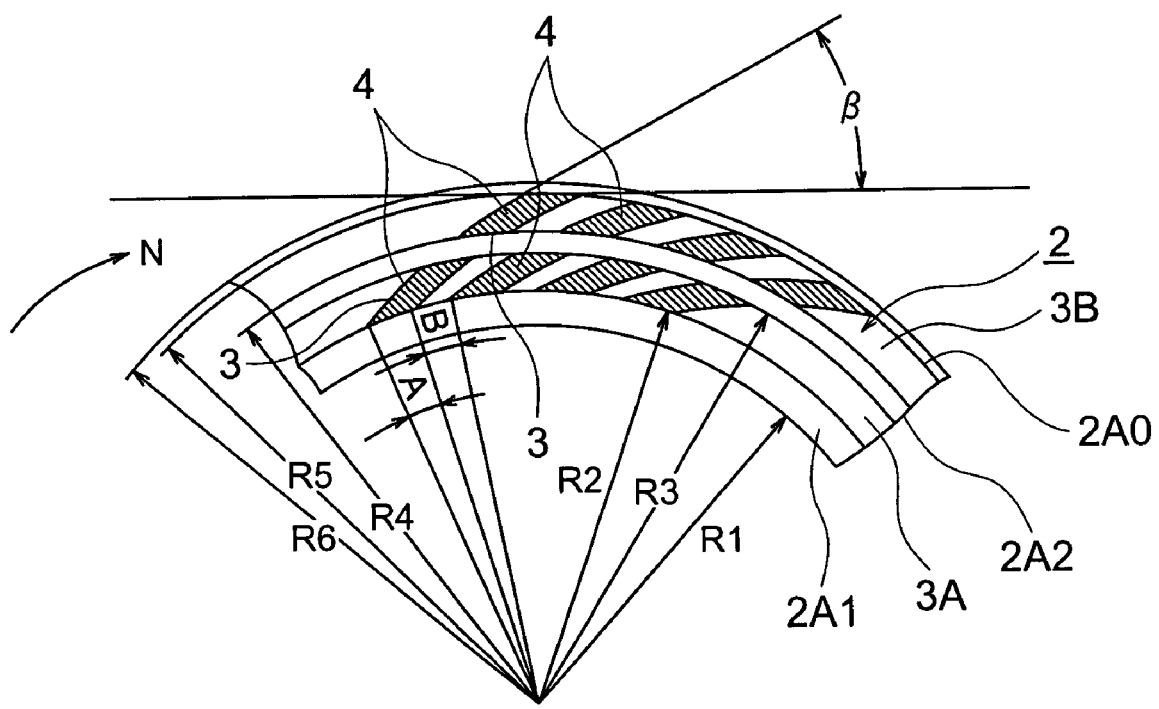
FIG. 4 is a front view of an enlarged fragment of the sliding face shown in FIG. 3.

FIG. 3 displays the sliding face 2 of the sliding element 1 as a second embodiment of the present invention. In the sliding face 2 of FIG. 3, a spirally curved single tier groove is intersected in the middle by the annular second dam section 2A2. FIG. 4 is an enlarged view of a fragment of the first and second dimple sections 3A, 3B and the dam section 2A (a general term of the first dam section 2A1; the second dam section 2A2, the zeroth dam section 2A0).

The sliding face 2 disposes the first dam section 2A1 inside the first dimple section 3A. The first dam section 2A1 is at the same height as the sliding face 2. Also the zeroth dam section 2A0 is located outside the second dimple section 3B. The disposition of the zeroth dam section is not mandatory and its deployment depends on functional design requirements such as improvement of a friction coefficient and a seal performance of the sliding element 1. As the matter of fact, a width of the zeroth dam section 2A0 may be altered by design or the zeroth dam section 2A itself can be omitted as shown in FIG. 1.

The width of the first dimple section 3A in a radial direction is given by R3–R2. Similarly the width of the second dimple section 3B in a radial direction is defined by R5–R4.

Groove form of the dimples 3 in the first dimple section 3A, second dimple section 3B can be so arranged that a width of the groove is a little widened near the outer circumferential side. This means that, as seen in FIG. 4, a spirally curved single tier groove 4 (a single row of dimples 5 lining up along the inclination direction) has a groove width W (refer W in FIG. 5) which gradually increases as the groove approaches the outer circumference. The single tier groove 4 is intersected by annular second dam section 2A2 and partitioned into the first dimple section 3A and second dimple section 3B wherein the inclination of the dimples 3 on the both inner circumferential side and outer circumferential side with respect to the second dam section 2A2 is coincident with a longitudinal direction of the dimples 3. The inclination angle of the dimples 3 is β=35 degrees.

Other construction is more or less of the same form as those used in FIG. 1 and FIG. 2. Hence no further explanation is needed.

The number of dam sections such as the second dam section 2A2 or third dam section 2A3 which intersects and partitions each single-tier groove 4 is determined by a total radial width R6–R1 of the sliding face 2. If the total width of the sliding face 2 is large, then the number of the dam sections should be increased for a better performance. Under this circumstance, dimensions of the groove in the dimple 3 should be so arranged that the longitudinal length of the groove is in the range of from one and a half times to twelve times of the width. More preferably the width is in the range of from twice to ten times of the width W.

The shape of the single tier groove 4 which is disposed on the sliding face 2 and determines the form of dimples 3 includes as embodiments of the present invention an inclined spiral curve (circular arc), a straight line, an S-shaped curve, and a houndstooth form. Then the single tier grooves 4 are crossed over by the second dam section 2A2 and the zeroth dam section 2A0 to partition the dimple sections 3A, 3B. Similar effect will be obtained with the dimples 3, not being lined up with the single tier groove 4 but being disposed in a houndstooth manner.

The annular dam section 2A consisting of a plurality of rings not only provides a seal against fluid but also, in conjunction with grooves of the dimples 3, effectively prevents the sliding face 2 from being damaged during a sliding motion.

The sliding element 1 is made of a hard material such as super hard alloy, silicon carbide, ceramic and so on. In particular, silicon carbide or the like is preferred for the sliding element 1. That is, not only the strength of the sliding element 1 is enhanced but also anti-abrasion performance of the sliding face is improved.

On the other hand, the relative art 1 which only dispose a plurality of radially extending spiral grooves on the sliding face exhibits a limited performance in terms of retaining a fluid on the sliding face. Also the relative art 1 only has a limited ability of pushing back a fluid to a fluid reservoir. If a sliding element is made of silicon carbide or the like, it is prone to cause damage at a spiral groove in the sliding face 110A. Once a portion of the sliding face 110A is damaged, then the damage is likely to propagate through individual spiral grooves. The sliding element 1 of the present invention, however, provides the dam section 2A for improving a seal performance by holding back the fluid. Presence of the dam section 2A also effectively prevents the dimples 3 from causing damage to the sliding face 2.

Figure 5:
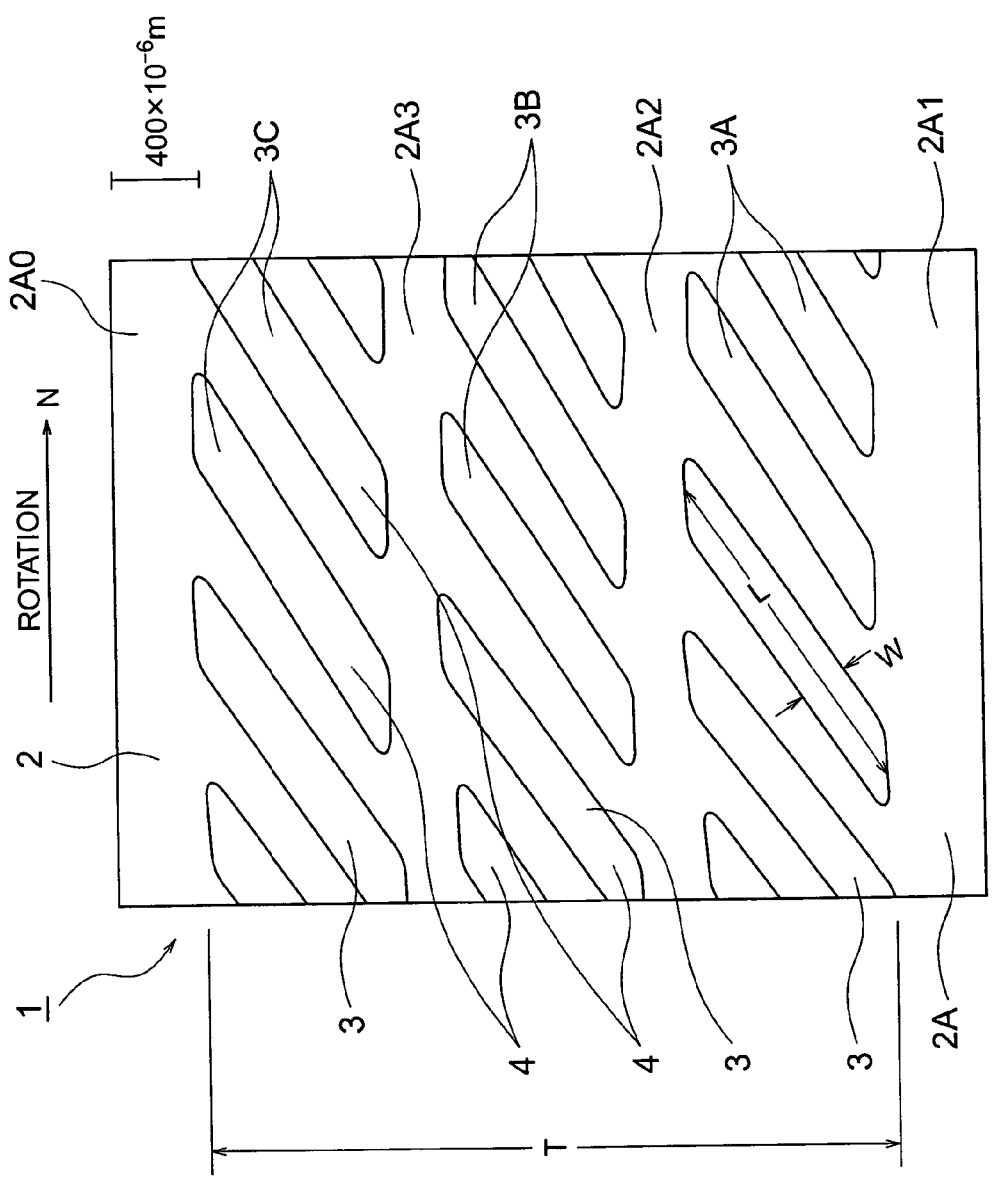
FIG. 5 is a front view of a fragment of a sliding face of a sliding element representing a third preferred embodiment related to the present invention.

FIG. 5 shows a fragment of the sliding face 2 as a third embodiment of the present invention which is obtained by projecting a microscopic picture of the sliding face 2. In the sliding face 2, the first dimple section 3A, the second dimple section 3B, and the third dimple section 3C, all of which consist of dimples 3, are defined by partitioning single tier grooves 4 by means of the second dam section 2A2 and the third dam section 2A3. These dimples 3 have more or less an uniform the width W and are inclined with respect to a diameter wherein a form of the dimples 3 is a straight groove along the inclination.

The Zeroth dam section 2A0 is disposed in the outside of the third dimple section 3C. Overall form of the sliding face 2 is similar to FIG. 1 and it has the first dam section 2A1, the second dam section 2A2 and the third dam section 2A3. For instance, the plurality of the dimples 3 defined by the entire dam sections 2A may have a form such as a rectangle whose both ends are half circles.

The width W of the rectangular groove of the dimple 3 is in the range of from $150 \times 10^{-6}$ m to $1000 \times 10^{-6}$ m. There exist examples wherein the groove width W is $150 \times 10^{-6}$ m or $250 \times 10^{-6}$ m. The longitudinal length L of the dimple 3 along the inclination is so arranged that it is more than two and a half times of the width W and is no more than a half of the width of the sliding face 2 in a radial direction (defined by R7–R1 in FIG. 1). More specifically, there is an example wherein the length L of the dimples 3 is $1000 \times 10^{-6}$ m or $1600 \times 10^{-6}$ m. The depth of the dimples 3 is in the range of from $1 \times 10^{-6}$ m to $25 \times 10^{-6}$ m. The inclination angle of the dimple 3 is $\beta = 42$ degrees.

Figure 6:
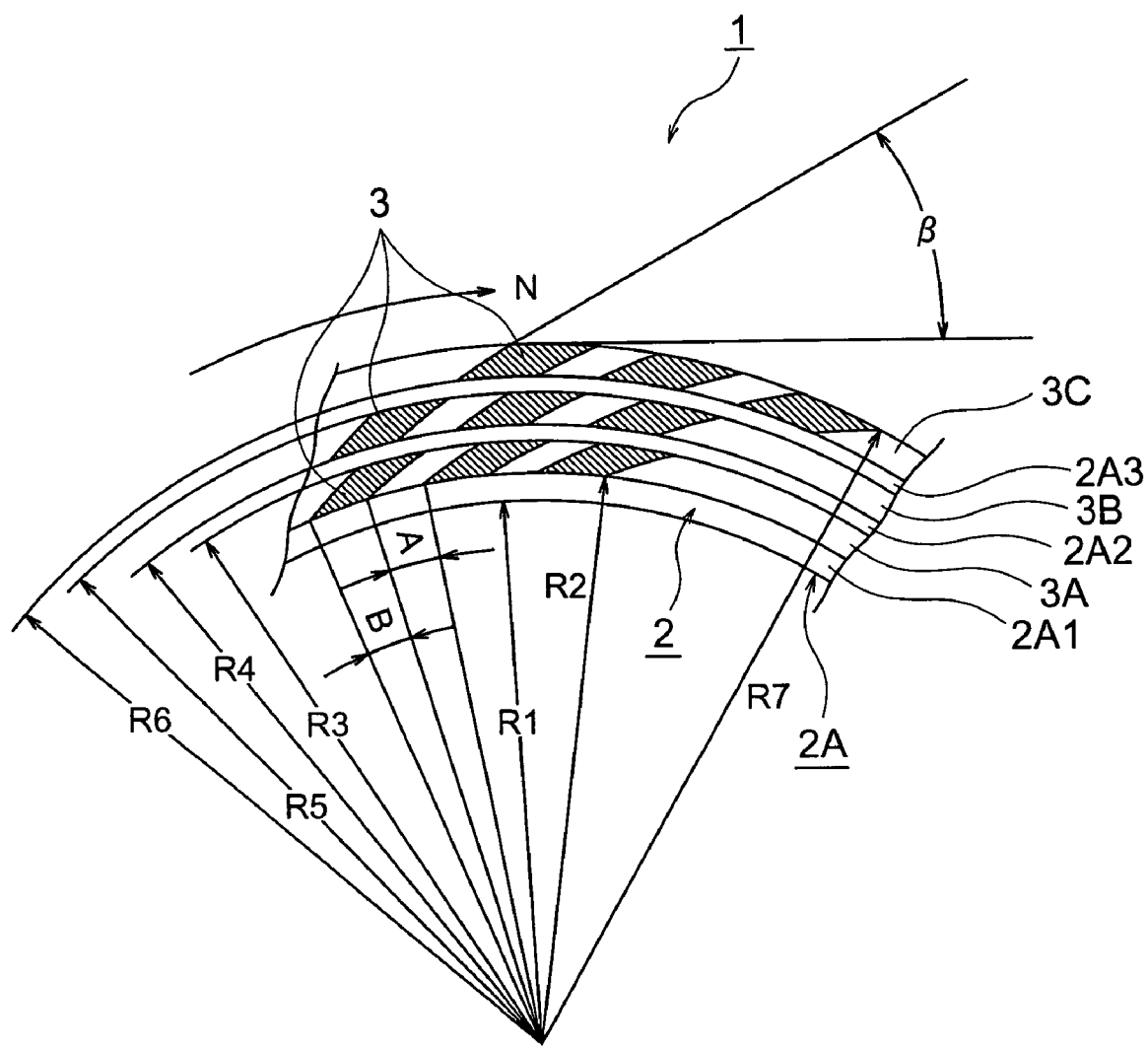
FIG. 6 is a front view of a sliding face of a sliding element representing a fourth preferred embodiment related to the present invention.

FIG. 6 show a fragment of the sliding face 2 of the sliding element 1 as a fourth embodiment of the present invention. In FIG. 6, the first dimple section 3A, the second dimple section 3B, and the third dimple section 3C constitute three concentric annuli in the sliding face 2 while the first dam section 2A1, the second dam section 2A2, and the third dam section 2A3 also form three concentric annuli. What FIG. 6 differs from FIG. 2 is that the dimples 3 are arranged in a houndstooth manner along the inclination and the second dimple section 3B is located off the line connecting the first dimple section 3A and the third dimple section 3C. The inclination angle measured from a tangential line is $\beta = 40$ degrees. The sliding element thus arranged can provide the same effects as the sliding element 1 of the first embodiment.

Figure 7:
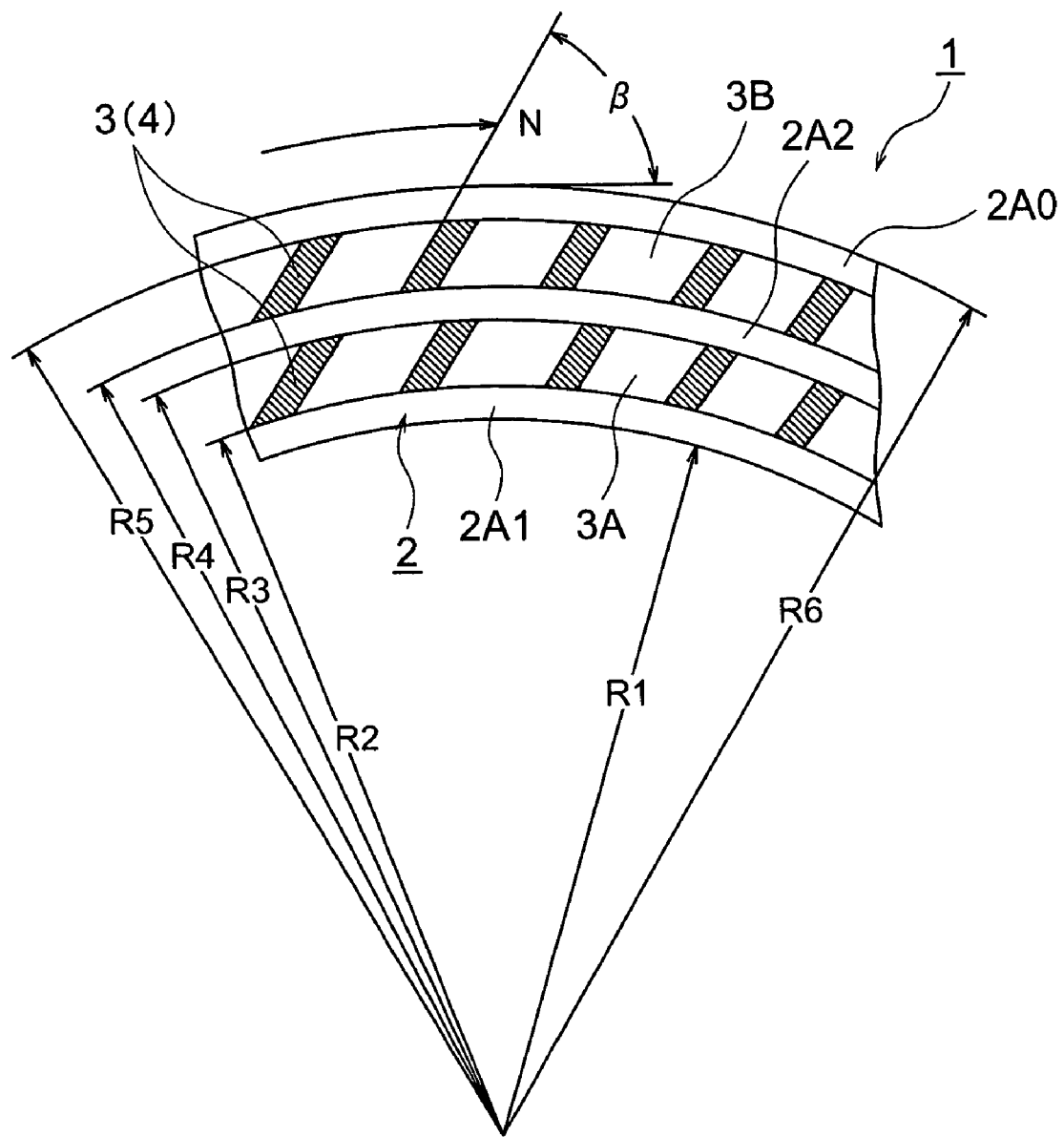
FIG. 7 is a front view of a sliding face of a sliding element representing the fifth preferred embodiment related to the present invention.

FIG. 7 shows a fragment of the sliding face 2 of the sliding element 1 as a fifth embodiment of the present invention. In FIG. 7, the sliding face 2 disposes the first dimple section 3A, the second dimple section 3B, the first dam section 2A1, the second dam section 2A2 and the zeroth dam section 2A0 similarly to FIG. 4. What the sliding face 2 in FIG. 7 differs from that in FIG. 4 is that in FIG. 7 the first dimple section 3A and the second dimple section 3B have an offset to mutually opposite sides relative to the inclination direction. The individual dimples 3 have a straight form with a uniform width along the inclination. And the inclination angle $\beta$ of the dimple 3 is 55 degrees. Other portions are constructed in more or less the same manner as FIG. 4. The sliding element thus arranged exhibits the same effects as a sliding element 1 in FIG. 1.

Figure 8:
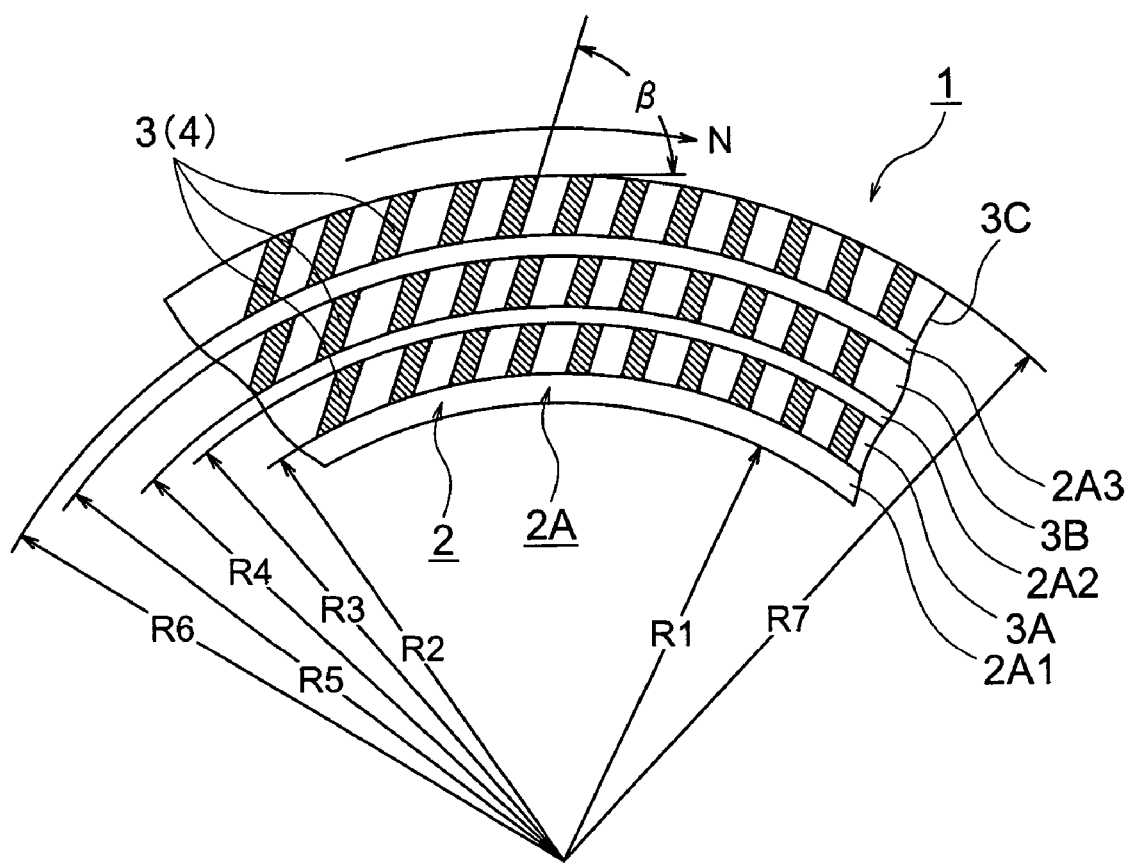
FIG. 8 is a front view of a sliding face of a sliding element representing the sixth preferred embodiment related to the present invention.

FIG. 8 shows a fragment of the sliding face 2 of a sliding element 1 as a sixth embodiment of the present invention. In FIG. 8, the sliding face 2 disposes the first dimple section 3A, the second dimple section 3B, the third dimple section 3C, first dam section 2A1, second dam section 2A2 and third dam section 2A3 similarly to FIG. 2. What FIG. 8 differs from FIG. 2 is that the dimples 3 of the first dimple section 3A, the second dimple section 3B and the third dimple section 3C are arranged in a houndstooth manner along the inclination. The individual dimples 3 have a straight form with a uniform width along the inclination. And the inclination angle $\beta$ of the dimple 3 is 68 degrees. Other portions are constructed in more or less the same manner as FIG. 2. The sliding element thus arranged also exhibits the same effects as a sliding element 1 in FIG. 1. In particular, the sliding element 1 in FIG. 8 exhibits an excellent seal performance since the inclination angle $\beta$ is large.

For the aforementioned embodiments, one of the methods for fabricating dimples 3 on the sliding face 2 made of hard material is a sand blasting in which a photosensitive film for sand blasting is glued on the sliding face.

In this method, a photosensitive film for sand blasting is placed on the sliding face 2. A positive film on which arrays of dimples 3 are printed is closely placed on the photosensitive film, and the photosensitive film is subjected to an exposure. The photosensitive film then is developed and a subsequent sand blasting provides dimples 3 which are identical to those printed on the positive film.

FIG. 9 shows an example of a mechanical seal 20 which deploys the sliding element 1 of the present invention.

The mechanical seal 20 uses the sliding element 1 of the present invention as the rotary seal ring. The sliding element 1 with the sliding face 2 is mounted on a rotary shaft 50 via O-ring 25. In addition, the stationary seal ring 10 being made of silicon carbide which has the polished smooth sliding face 10A for a fluid-tight seal contact is fixedly attached to the housing 60. The housing 60 and the stationary seal ring 10 dispose the O-ring 25 therebetween and the O-ring 25 provides a fluid-tight seal between the housing 60 and the stationary seal ring 10.

The sliding face 2 of the sliding element 1 is resiliently urged by the spring 9 against the opposing sliding face 10A. And the sliding face 2 of the sliding element 1 being pressed against the opposing sliding face 10A provides a fluid-tight seal therebetween. The sliding element disposes the first dimple section 3A, the second dimple section 3B, the first dam section 2A1 and the second dam section 2A2. This construction being comprised of the first dimple section 3A, the second dimple section 3B, the first dam section 2A1 and the second dam section 2A2 can enhance a seal performance and decrease a frictional resistance. It provides an excellent seal performance when the rotary shaft 50 operates at a slow speed in particular.

The primary feature of the above mentioned dimples 3 is not simply that a plurality of grooves are disposed, but that the first dam section 2A1, the second dam section 2A2 . . . are disposed each of which forms a narrow band annulus between tiers of circumferentially disposed dimples 3. Presence of the first dam section 2A1, the second dam section 2A2, the third dam section 2A3 . . . allows the number of the inclined dimples 3 disposed to be increased. Furthermore, the dam section 2A (general term for the first dam section 2A1, the second dam section 2A2, the third dam section 2A3 . . . ) provides a reinforcement for the sliding face 2 whose strength has been reduced by disposition of the dimples 3. The rotary direction of the sliding face 2 is denoted by the pointed arrow N which coincides with the inclination direction of the dimples 3. As the result, both an excellent seal performance and a reduction of friction coefficient can be achieved.

The sliding element 1 of the present invention can also be utilized even when a fluid is located to an inner circumferential side. In case of the fluid being located to the inner circumferential side, the rotary direction of the sliding face 2 becomes opposite (reverse direction with respect to the pointed arrow N in FIG. 1 through FIG. 8) which is not shown in the figures.

It has already been mentioned that the sliding element 1 of the present invention can be used in a mechanical seal device, a bearing, a sliding ring and so son. When it is deployed in a mechanical seal device in particular, the sliding element 1 can be used as either stationary seal ring or rotary seal ring or both. When the sliding element 1 is used for either one of a pair of seal rings, a sliding face of the other seal ring may be arranged as a flat sliding face.

When the element 1 is utilized in a bearing, it serves as a sliding face which sustains a radial or thrust load of the shaft. In particular, if a lubricant is located to an inner side relative to a shaft, an inclination angle β is so arranged that the lubricant is pumped towards the inner side. For instance, it is known that a good performance is obtained with β=45 degrees.

Figure 10:
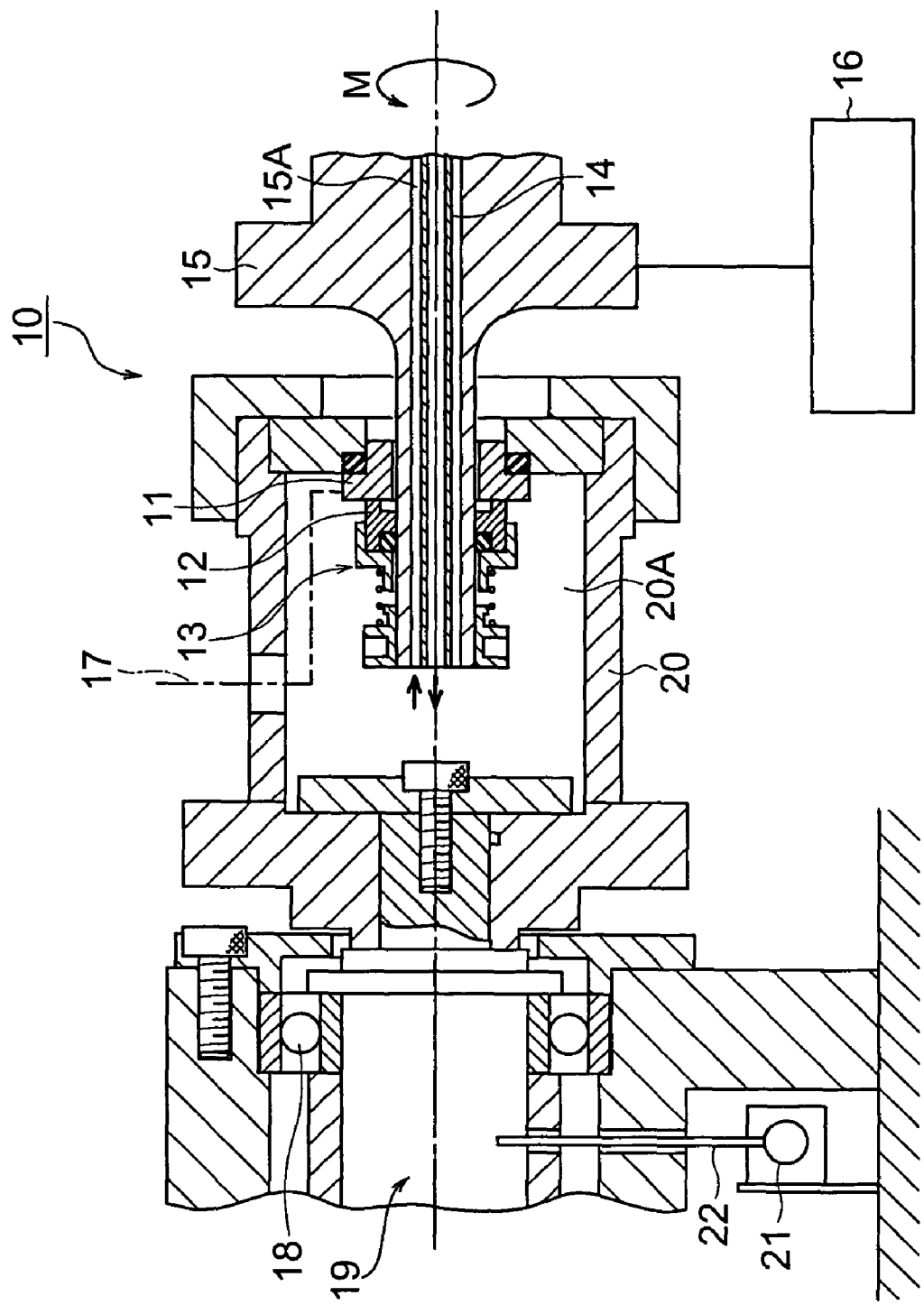
FIG. 10 is a cross-sectional view of a testing apparatus for evaluating a sliding element related to the present invention.

FIG. 10 is a cross-sectional view of the testing apparatus 10 for evaluating a sliding element 1 related to the present invention.

In FIG. 10, the testing apparatus 10 for sliding element 1 disposes in its center a rotatable cylindrical housing 20. The stationary seal ring 11 is sealingly fitted to an installation surface in the fluid chamber 20A within the housing 20 via rubber-made O-ring. The retainer 13 being fixed to the rotary shaft 15 resiliently urges the rotary seal ring 12 by means of a spring in an axially movable manner. The contact between the seal face of the rotary seal ring 12 and the opposing seal face of the stationary seal ring 11 provides a fluid-tight seal so that the fluid does not escape to the external.

The apparatus 10 disposes the rotary shaft 15 driven by the motor 16 and there is the flow passage 15A along the axis of the shaft 15. Inside the flow passage 15A is disposed the communication passage 14 which is a through passage. A fluid such as oil (for example, Super Multi Oil 10 manufactured by IDEMITSU Co., Ltd) is provided from the passage 14 into the fluid chamber 20A and ejected to the external through the flow passage 15A as indicated by the arrows in the figure.

External ends of the flow passage 15A and the communication passage 14, which are not shown in the figure, are connected to a circulation pipe which is also omitted from the figure. A pump apparatus connected to the pipe controls a fluid circulation with a specified temperature and pressure. Also a speed of the motor 16 is controlled by an inverter which is not shown in the figure either.

The housing 20 retaining the stationary seal ring 11 is fixedly connected to the shaft 19 which is supported by the bearing 18 in a freely rotatable manner. Therefore, the housing 20 is so arranged that a rotary sliding friction between the stationary seal ring 11 and the rotary seal ring 12 allows the housing 20 to rotate.

A hole which diameter is 2 mm is disposed in 1 mm away from the opposing seal face of the stationary seal ring 11 and the hole is connected to an end of a conductive line such as PlatinumRhodium-Platinum or Alumel-Chromel which other end is connected to a thermo-electric thermometer which is not shown in the figure. Temperature of the sliding face of the stationary seal ring 11 is measured by the thermo-electric thermometer.

The support block which supports the shaft 19 is equipped with the load cell 21 and the sliding torque M can be measured by way of the cantilever 22. Friction coefficient F then is computed from the sliding torque M. Its deriving formula is F=M/(W×Rm) where W is a load and Rm is an average radius of the sliding face.

This testing apparatus 10 is internal-flow, unbalancing type, and the seal face 2 is urged by a fluid pressure and a resiliently urging force of a spring. In case of a zero fluid pressure, the sliding face 2 is urged by the spring of the retainer 13 alone. Measured items by this testing apparatus include the sliding torque M of the sliding element 2, temperature of the sliding face 2, fluid temperature and a volume of the fluid leaked through the sliding face 2.

1. Test results in terms of fluid pressure versus friction coefficient of sliding elements related to the present invention and a reference example.

A. Experiment 1 (P1) for testing the first sliding element 1 of the present invention.

1) The sliding face 2 of the first sliding element 1 which is a rotary seal ring appears like FIG. 1 or FIG. 5. And an oppositely disposed stationary seal ring is made of silicon carbide and has a flat sliding face on its one end.

The sliding element 1 is tested by the testing apparatus 10 displayed in FIG. 10.

2) The dimensions of the sliding element 1 a. The rotary seal ring is a sliding element made of silicon carbide (inner diameter 25 mm, outer diameter 44 mm, length 12 mm), b. The stationary seal ring is a sliding element made of silicon carbide (inner diameter 28 mm, outer diameter 50 mm, length 14 mm), c. The size of the sliding face is 32 mm in inner diameter and 40 mm in outer diameter, d. The arrangement and form of the dimples 3 is as shown in FIG. 1 and FIG. 5, e. The width of the dimple 3 is 250×10$^{-6}$ m, the length 1600×10$^{-6}$ m, and the depth H 8×10$^{-6}$ m.

f. The inclination angle β of the dimples 3 is 30 or 42 degrees.

3) The surface roughness of the sliding face is Rz 0.2×10$^{-6}$ m,

4) The flatness is no more than 1 band (helium light),

5) The testing duration is 30 minutes,

6) The temperature of the fluid is 30 degree Celsius,

7) The fluid pressure is 0.3 MPa, 0.5 MPa or 1.0 MPa,

8) The Tangential velocity is 0.3 m/s,

9) The spring load is 20N,

10) The fluid is Super Multi Oil 10 manufactured by IDEMITSU Co., Ltd.

B. Experiment 2 (P2) for testing a second sliding element 1 of the present invention.

1) The sliding face 2 of the second sliding element 1 which is a rotary seal ring appears like FIG. 6 or FIG. 8. And an oppositely disposed stationary seal ring is made of silicon carbide and has a flat sliding face on its one end.

The second sliding element 1 is tested by the testing apparatus 10 displayed in FIG. 10.

2) Other testing conditions for the second sliding element 1

Testing conditions for the second sliding element 1 is the same as those in the experiment 1.

C. Comparison experiment 1 (S) for testing a reference sliding element

1) The reference sliding element has the same form and the same material as the previous two sliding elements 1 of the present invention. However, both sliding faces of the reference element are polished flat surfaces.

2) Testing conditions for the reference sliding element is the same as those in the experiment 1.

Figure 11:
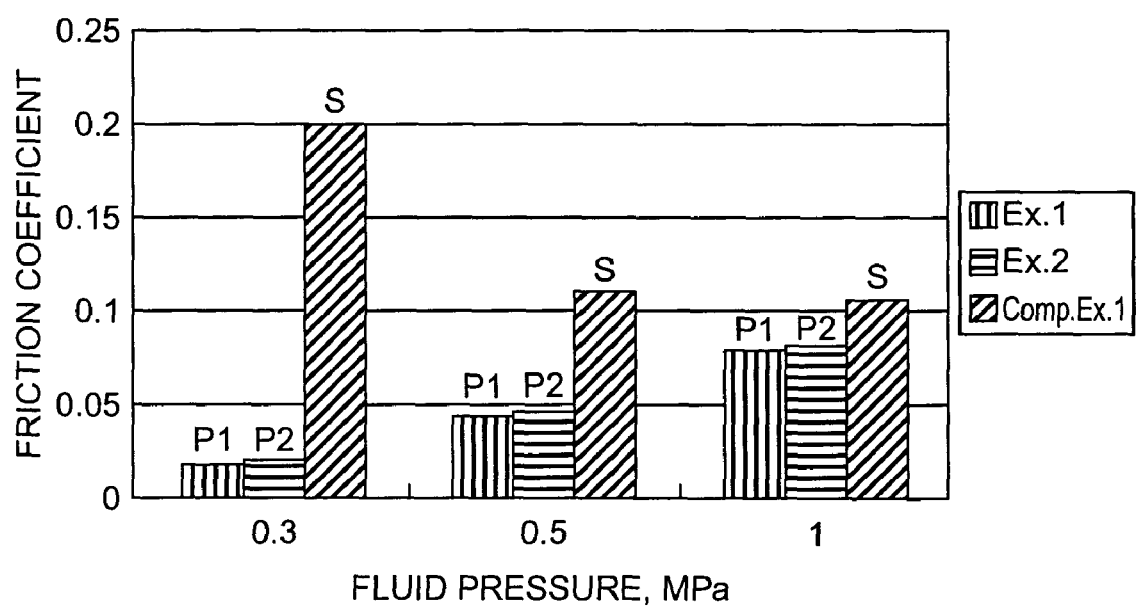
FIG. 11 is a bar chart representing test results on fluid pressure on sliding face versus friction coefficient for a sliding element related to the present invention and the referential sliding element 1.

Comparison results thus obtained of the first sliding element 1 and second sliding element 1 of the present invention and the reference sliding element in terms of fluid pressure versus friction coefficient are shown in FIG. 11.

In FIG. 11, the bar charts P1, P2 and S represent friction coefficients of the first sliding element 1, the second sliding element 2 and the reference sliding element, respectively. FIG. 11 indicates that the first and second sliding elements 1 display very similar friction coefficients. Other test results which were not described here also show that sliding elements 1 of the first embodiment through the sixth embodiment present more or less the same amount of friction coefficient.

2. Test results in terms of fluid pressure versus fluid leakage for sliding elements related to the present invention and a reference example.

A. Experiment 1 (P1) for testing the first sliding element 1 of the present invention.

1) The first sliding element 1 of the present invention is identical with the one used in the experiment 1 for friction coefficient in all aspects.

2) Other testing conditions are also the same as those employed in the experiment 1 for friction coefficient.

B. Experiment 2 (P2) for testing the second sliding element 1 of the present invention.

1) The second sliding element 1 of the present invention is identical with the one used in the experiment 2 for frictional coefficient in all aspects.

2) Other testing conditions are also the same as those employed in the experiment 2 for frictional coefficient.

C. Comparison experiment 2 (S) for testing a reference sliding element

1) The reference sliding element has the same form and the same material as the previous two sliding elements 1 of the present invention. However, one of sliding faces of the reference element retain many spirally curved grooves on their polished flat surfaces, but not the dam section 2A intersecting with the grooves.

2) Testing conditions for the reference sliding element is the same as those in the previous comparison experiment 1.

The above conditions are employed to conduct experiments for measuring fluid leakage. Comparison results of the sliding elements 1 of the present invention and the reference sliding element in terms of fluid leakage (g/h) are shown in FIG. 12.

Figure 12:
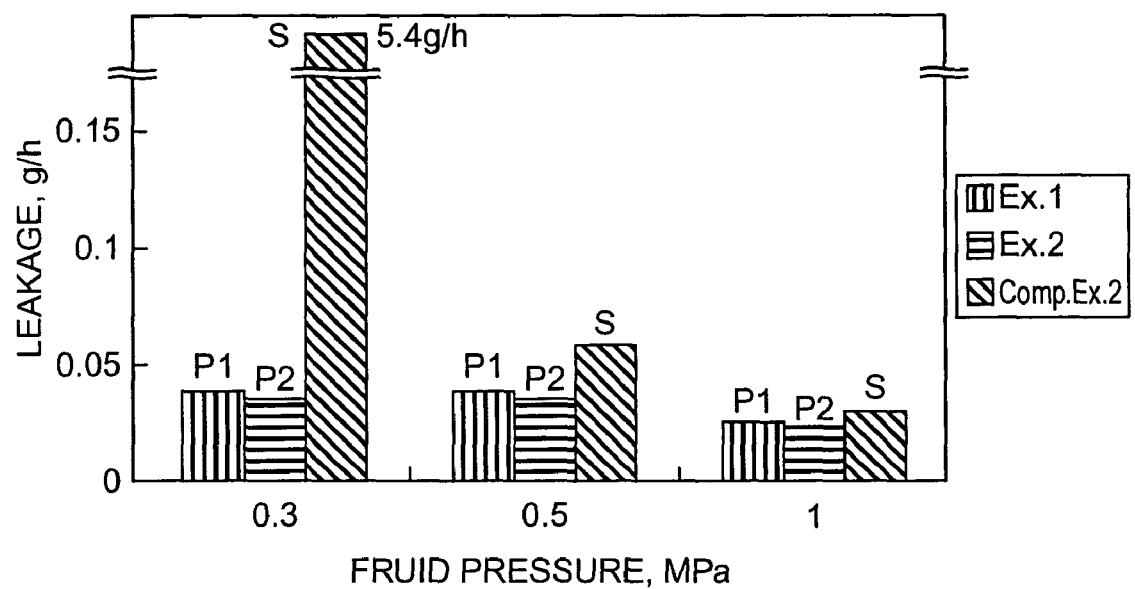
FIG. 12 is a bar chart representing test results on fluid pressure between seal faces versus fluid leakage for a sliding element related to the present invention and the referential sliding element 2.
Figure 13:
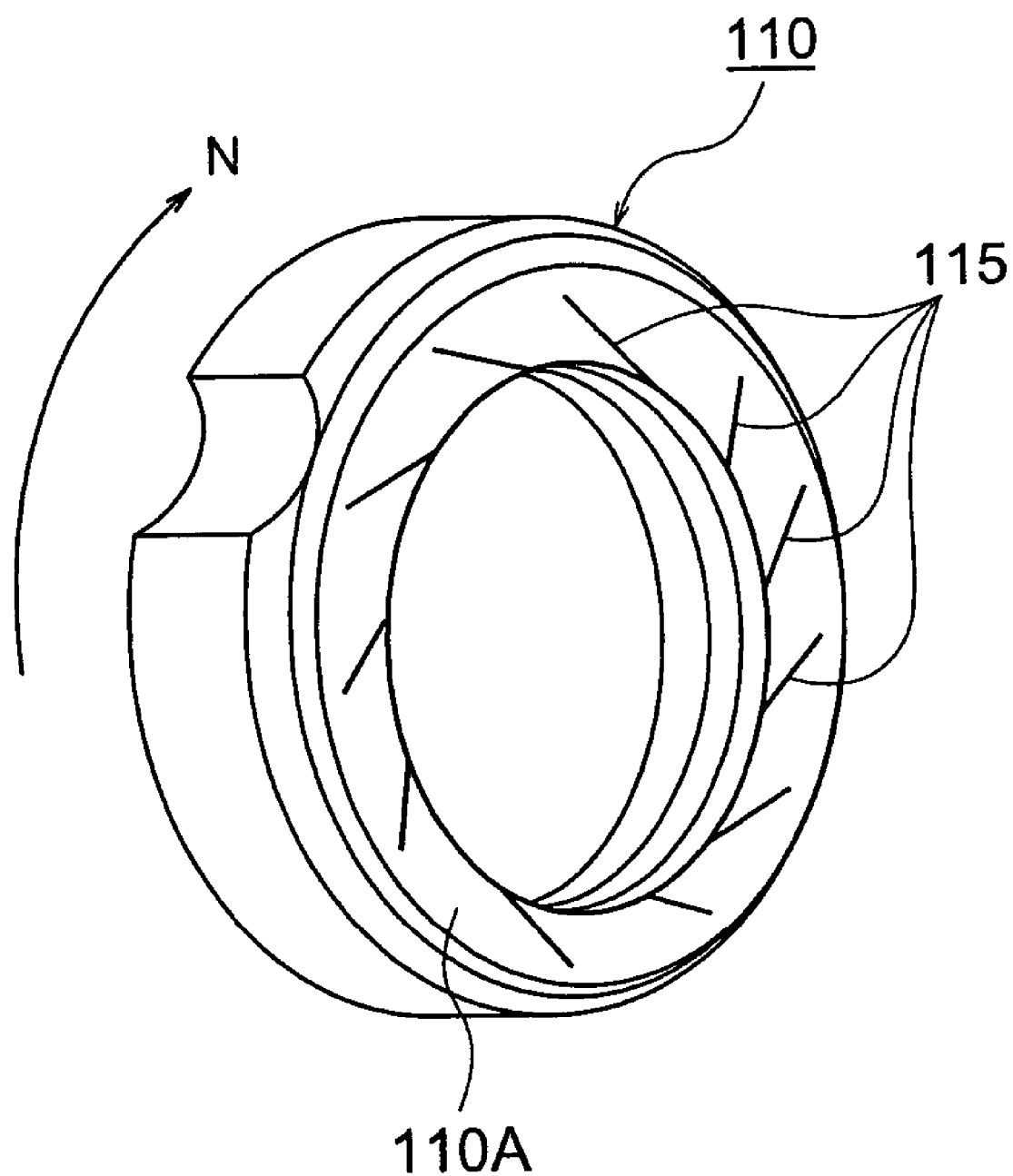
FIG. 13 is an oblique view of a sliding face of one of a pair of sliding elements related to the prior art 1.
Figure 14:
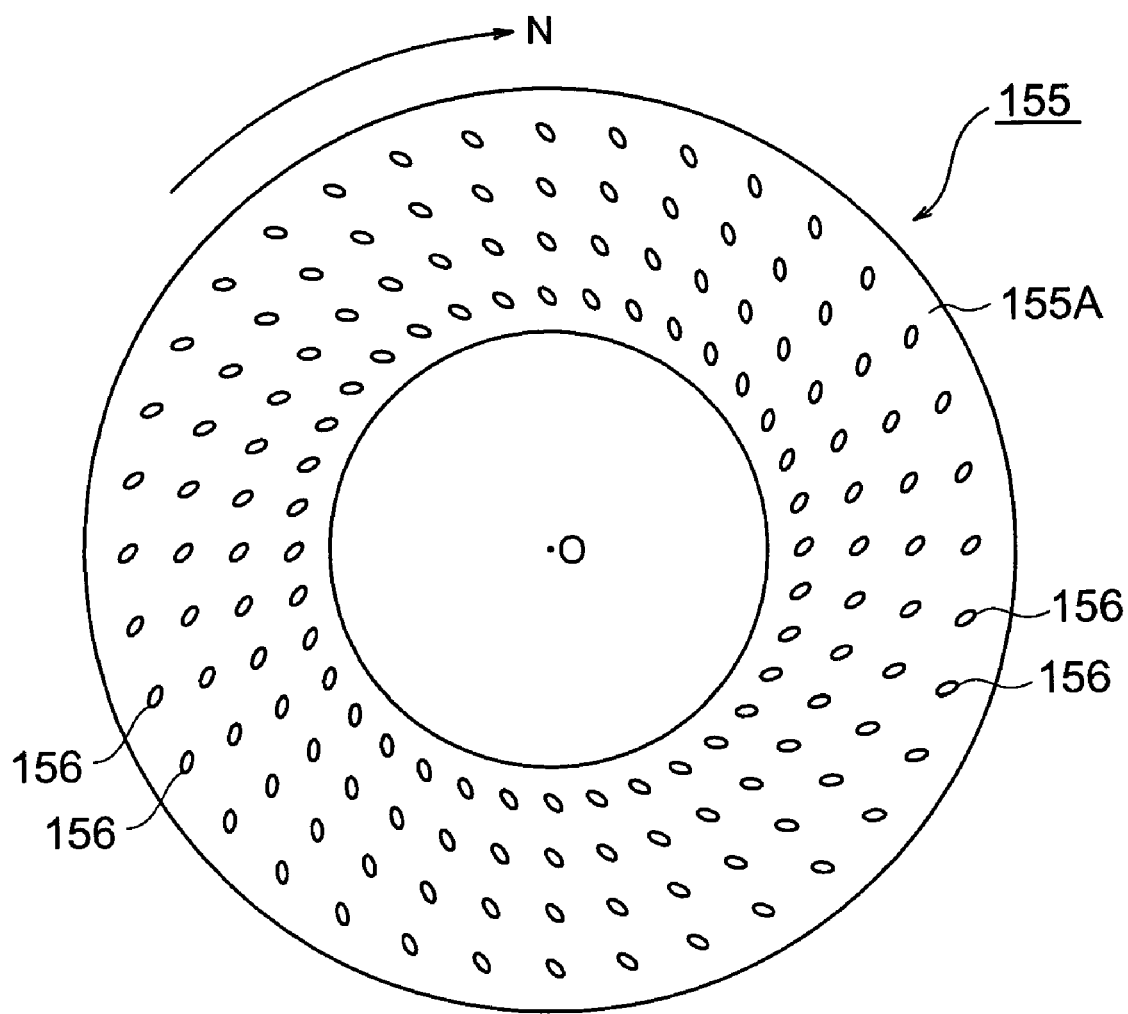
FIG. 14 is a top view of a sliding face of one of a pair of sliding elements related to the prior art 2.

In FIG. 12, the bar charts P1, P2 and S represent amounts of fluid leakage for the first sliding element 1, the second sliding element 2 and the reference sliding element, respectively. FIG. 12 indicates that the first and second sliding elements 1 display very similar amount of fluid leakage. Other test results which were not described here also show that the sliding elements 1 of the first embodiment through the sixth embodiment present more or less the same amount of leakage.

Now the comparison results in fluid pressure versus friction coefficients with respect to the first sliding element 1, the second sliding element 1 and the reference sliding element (comparison experiment 1) are analyzed. Similarly, analyses on the results in fluid pressure versus fluid leakage with respect to the first sliding element 1, the second sliding element 1 and the reference sliding element (comparison experiment 2) are provided as well.

When the test results on fluid pressure versus friction coefficient for three different samples are compared; the first and second sliding elements 1 of the present invention and the reference sliding element of comparison experiment 1, FIG. 11 clearly indicates that the sliding elements 1 of the present invention exhibit significantly low friction coefficients especially in the range of low fluid pressure. Next, when the test results on fluid pressure versus fluid leakage for three different samples are compared; the first and second sliding elements 1 of the present invention and the reference sliding element of comparison experiment 2, FIG. 12 apparently shows that the sliding elements 1 of the present invention exhibit an excellent seal performance especially in the range of low fluid pressure. It should be noted that many of general machines and apparatuses are typically utilized in this kind of low pressure range.

Described below are other inventions related to the current invention.

The sliding element 1 of the second invention related to the present invention has the dimple sections 3A, 3B, 3C . . . wherein the inclined individual dimples 3 have a form of circularly curved groove and the width of the groove is gradually increased as the groove approaches where a fluid is reserved.

In the sliding element 1 of the second invention, the dimples 3 of individual dimple sections 3A, 3B, 3C . . . are inclined towards a rotary direction along a circular arc and a width of the groove gradually increases as it approaches the fluid side. Therefore this makes it easier for the fluid to be taken into between the sliding faces 2,2. At the same time, the dam section 2A makes a fluid distribute over the sliding face 2 and decreases a friction coefficient accordingly. Therefore, wear of the sliding face 2 is prevented.

The sliding element 1 related to the third invention disposes dimples 3 portion of which being located near the fluid side have an open end towards the fluid side.

In the sliding element 1 of the third invention, the open end of the dimples 3 located near the fluid side lets the fluid easily flow into between a pair of the sliding faces 2,2. The fluid thus flowing in from the open end of the groove helps decrease the friction coefficient of the sliding face 2. And the dam 2A keeps back the fluid thus flowing in and exhibits a seal performance by inducing a reverse flow. Therefore, the sliding element 1 not only can decrease a friction coefficient but also can improve a seal performance even under a low fluid pressure range.

The sliding element 1 of the fourth invention related to the present invention disposes the first dam section 2A1 at an edge portion of the sliding face 2 which is located in an opposite end relative to a fluid.

Since the sliding element 1 of the fourth invention retains the first dam section 2A1 located on the opposite side of a circumferential edge relative to the fluid, the first dam section 2A1 holds back a fluid flowing in between a pair of the sliding faces 2,2 and the fluid is reserved in the dimples 3 which are disposed in the sliding face 2 wherein the whole dam section 2A provides a seal against the fluid. Therefore, not only a reduction in friction coefficient of the sliding face 2 but also improvement of seal performance against the fluid can be achieved.

The sliding element 1 of the fifth invention related to the present invention has the dam sections 2A1, 2A2, 2A3 . . . wherein a width of each dam section in a radial direction is made smaller than the width L of dimple 3 in a radial direction.

In the sliding element 1 of the fifth invention, individual dimples 3 disposed on the sliding face 2 have a form of an elongate groove, which enables a fluid to spread over the sliding face 2 forming a thin layer. The fluid thus retained on the sliding face 2 reduces the friction coefficient of the sliding face 2. At the same time, the fluid retained on the sliding face 2 helps enhance the seal performance by blocking extra fluid from flowing in.

The sliding element 1 related to the present invention, as described above, not only decreases frictional resistance but also exhibits an excellent seal performance. In particular, dimples 3 arranged on the sliding face 2 are able to reserve a fluid in a uniform manner and a large number of dimples 3 being lined up exhibit an ability of pushing back the fluid towards a fluid reservoir. Deployment of the dam sections 2A1, 2A2, 2A3 . . . which partition the dimple sections 3A, 3B, 3C . . . improves a seal performance against the fluid. This leads to an exhibition of a superb fluid-tight seal performance. Also the sliding element 1 exhibits an effective seal performance of the fluid over a pressure range commonly used in general apparatus.

Furthermore, even under a circumstance of a low rotational speed or low fluid pressure, reduction in friction coefficient as well as a good seal performance against fluid is maintained.

In addition, the presence of the dam section 2A not only prevents a possible damage to the sliding face 2 which retains a large number of the dimples 3 but also effectively avoids the wear of the sliding face 2.

Having described specific embodiments of the invention however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sliding element for providing a seal against a fluid between sliding faces of a pair of relatively slidable components, one of said components being a stationary sliding element and the other of said components being a rotary sliding element, said fluid being located in either an inner circumferential side or an outer circumferential side of said sliding faces, said sliding element comprising:
    a) dimples being disposed on at least one sliding face of said sliding faces and being inclined towards a rotary direction when viewed facing said fluid along a radial direction and being made longitudinally long along the inclination the dimples being comprised of grooves formed on the sliding face;
    b) a plurality of dimple sections having annular forms of different radii and being disposed on said sliding face and having said dimples being arranged along said annular forms; and
    c) a plurality of dam sections having annular forms and being disposed between said dimple sections, a surface of the dam sections in the same plane as the sliding face,
    wherein each of said dimples has a long rectangular shape extending along an inclination direction thereof, adjoining dimples arranged along the inclination direction between adjoining dimple sections are separated by one of the annular-shaped dam sections, and each of the dam sections has predetermined constant inner and outer diameters and is separated by one of the plurality of dimple sections.

2. The sliding element as in claim 1 wherein said dimples of said dimple sections line up along a circular arc and a groove width of said dimples gradually increases towards said fluid side.

3. The sliding element as in claim 1 wherein a groove end of said dimples of said dimple sections is open towards said fluid side.

4. The sliding element as in claim 1 wherein at least a first dam section is disposed on a circumferential edge portion of said sliding face which is located on the opposite side of said fluid side.

5. The sliding element as in claim 1 wherein a width of said dam sections in a radial direction is made smaller than a longitudinal length of said dimples.

6. The sliding element as in claim 1, further comprising a plurality of single tier grooves having a form of a circular arc, and being inclined relative to an outer circumference of at least one of the plurality of dam sections.

7. The sliding element as in claim 6, wherein the plurality of single tier grooves comprise a form selected from the group consisting of a spiral curve, a straight line, an S-shaped curve and houndstooth.

8. The sliding element as in claim 1, wherein a groove width of said dimples is uniform at both the inner circumferential side and the outer circumferential side of the sliding faces.

* * * * *